CERTIFICATE OF CORRECTION.

Patent No. 2,214,731.  September 17, 1940.

HERBERT G. KAMRATH.

It is hereby certified that error appears in the printed specification of the above numbered patent requiring correction as follows: Page 1, first column, line 13, for the word "assembly" read --element--; page 2, first column, line 36, for "high" read --right--; line 55, for "characters" read --character--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.

Sept. 17, 1940.   E. STRASSENBURG   2,214,754
PHOTOGRAPHIC SHUTTER
Filed Jan. 26, 1939   2 Sheets-Sheet 1
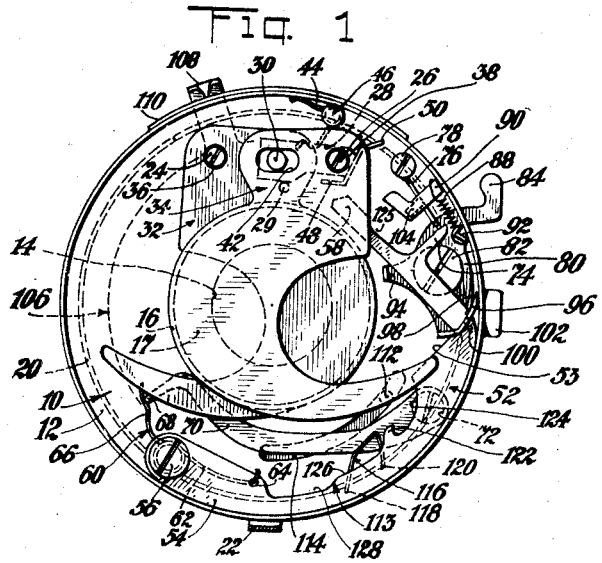
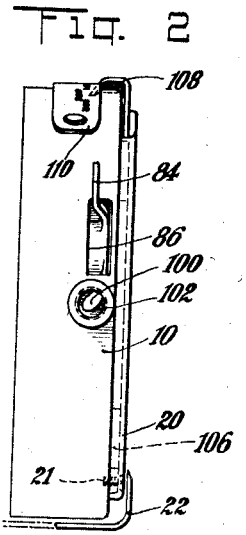
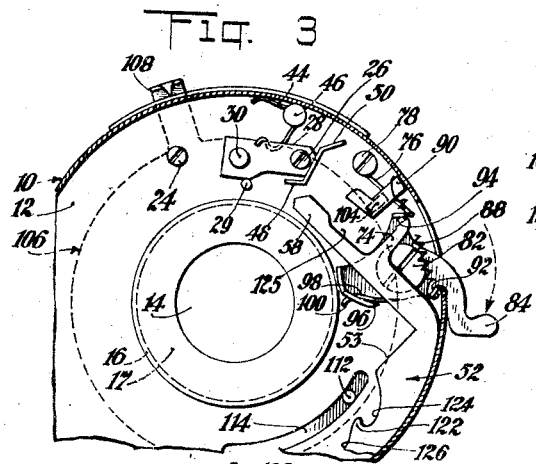
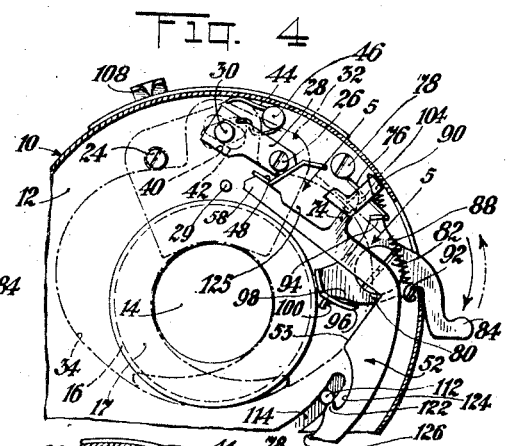
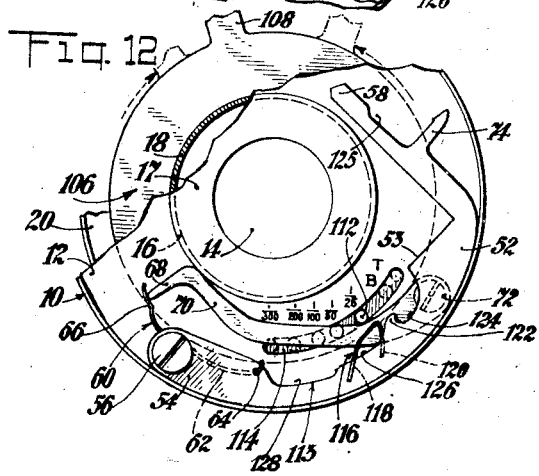
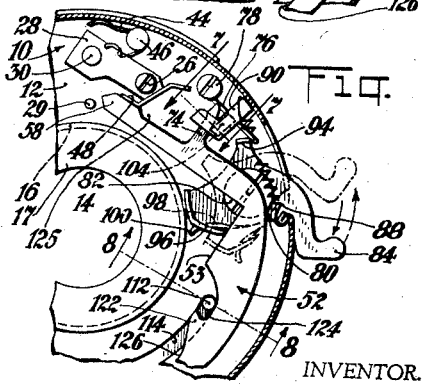
INVENTOR.
ERIC STRASSENBURG
BY
his ATTORNEY.

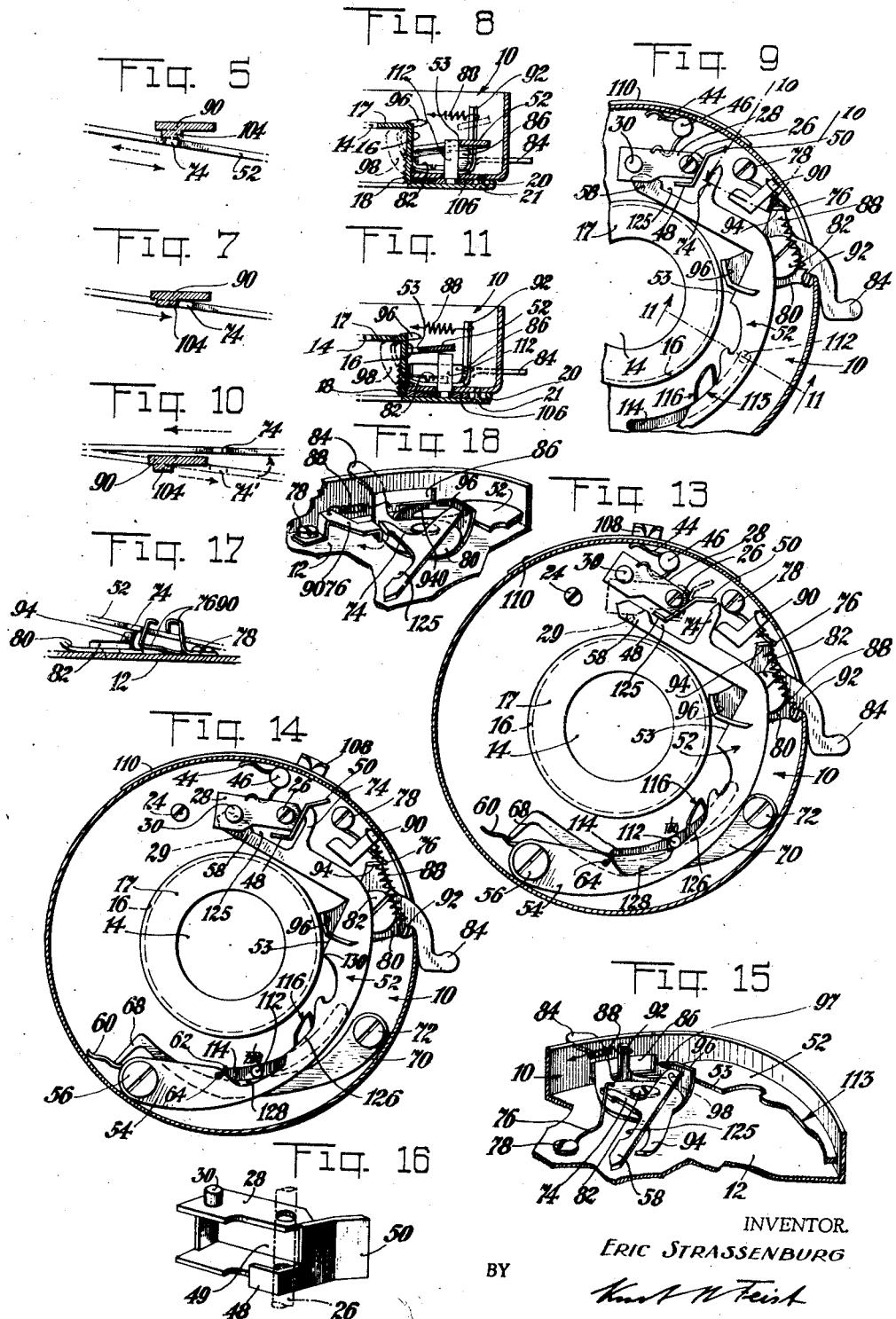

Patented Sept. 17, 1940

2,214,754

UNITED STATES PATENT OFFICE 2,214,754

PHOTOGRAPHIC SHUTTER

Eric Strassenburg, New York, N. Y., assignor to Histra Corporation, New York, N. Y., a corporation of New York Application January 26, 1939, Serial No. 252,848

19 Claims. (Cl. 95—62)

My invention relates to photography, and more particularly to photographic shutters for cameras.

One object of my invention is to provide a photographic shutter in which the main operating lever is automatically tensioned for the next operation and held in its tensioned inoperative position when the user of the shutter releases the trigger after an exposure, so that the user of the shutter pressing the trigger for the next operation feels only the resistance of the returning spring acting on the trigger, whether the shutter is adjusted for "time" exposure, "bulb" exposure or any "instantaneous" exposure.

Another object of my invention is to provide a shutter, by means of which extremely short "instantaneous" exposures may be obtained with a comparatively simple mechanism.

Still another object of my invention is to provide a shutter in which the manually adjustable setting mechanism for the adjustment of "time" exposure, "bulb" exposure or "instantaneous" exposure is also used for the variation of the tension of the spring acting on the main operating lever and causing various speeds of the latter for various "instantaneous" exposures.

In order to carry out my invention into practice I provide a photographic shutter comprising shutter blades, a spring pressed pivoted main lever for operating said shutter blades, an adjustable setting mechanism, said setting mechanism being adapted to cooperate with said spring pressed main lever for the determination of various exposures to be caused by the operation of said main lever, locking means for retaining said main lever in a tensioned inoperative position, a trigger for releasing said main lever from said locking means to initiate the operation of the main lever, resilient means connected to said trigger for returning same from its releasing position into its normal inoperative position, and an actuating element arranged on said trigger, said actuating element being adapted to engage said main lever for returning same into its tensioned inoperative position when said resilient means returns said trigger into its normal inoperative position.

The above mentioned objects and advantages as well as other objects and advantages will be more fully disclosed in the following specification reference being had to the accompanying drawings forming part of this specification, in which:

Fig. 1 is a rear end view of my shutter, the cover usually closing the shutter being removed to show the parts in normal inoperative position, Fig. 2 is a side end view of the shutter shown in Fig. 1, Fig. 3 is a fragmentary rear end view of the shutter adjusted for "bulb" exposure, some of the parts being removed for the sake of clarification, and the parts shown in the figure being in a position in which the depressed trigger has released the main lever, but the main lever has not yet actuated the shutter blades, Fig. 4 is also a fragmentary rear end view of the shutter adjusted for "bulb" exposure, in which, however, the main lever is in a position holding the shutter blades in open position, Fig. 5 is a cross-sectional view taken on line 5—5 of Fig. 4 illustrating the relative position between the main lever and a catching member of the shutter, when the parts of the shutter are in the open position of the "bulb" exposure, Fig. 6 is a fragmentary rear end view of the shutter adjusted for "time" exposure, the main lever being held in position for open shutter blades by the catching member of the shutter, Fig. 7 is a cross-sectional view taken on line 7—7 of Fig. 6 illustrating the relative position between the main lever and the catching member when the main lever is held in the position for open shutter blades, Fig. 8 is a cross-sectional view taken on line 8—8 of Fig. 6 illustrating the relative position between the main lever and a pin of the setting mechanism, when the main lever is in position for open shutter blades, Fig. 9 is a fragmentary rear end view of the shutter adjusted for "time" exposure similar to Fig. 6, in which, however, the main lever is in an intermediate position during its movement causing the closing of the shutter blades, Fig. 10 is a cross-sectional view taken on line 10—10 of Fig. 9, illustrating the relative position between the main lever and the catching member, when the main lever is in the position shown in Fig. 9, Fig. 11 is a cross-sectional view taken on line 11—11 of Fig. 9 illustrating the relative position between the main lever and the pin of the setting mechanism when the main lever is in the position shown in Fig. 9, Fig. 12 is a fragmentary rear end view of the shutter adjusted for an "instantaneous" exposure illustrating the setting mechanism, Fig. 13 is a rear end view of the shutter adjusted for a different "instantaneous" exposure, the parts being in a position in which the trigger is depressed and the main lever has brought the shutter blades into open position, Fig. 14 is a rear end view of the shutter adjusted for still another "instantaneous" exposure, the parts being in a position in which the trigger is depressed and the main lever has brought the shutter blades into closed position, Fig. 15 is a fragmentary perspective view of the shutter illustrating the trigger mechanism in the position holding the main lever in tensioned inoperative position, Fig. 16 is a perspective view of the blade carrier, Fig. 17 shows a different embodiment of the catching and locking means of the shutter, and Fig. 18 is a fragmentary perspective view of the shutter illustrating a further embodiment of the catching member and the trigger.

Referring now to the drawings, 10 indicates the shutter casing, the bottom 12 of said shutter casing has the exposure aperture 14. As best shown in Fig. 11, said aperture 14 is surrounded by the cylindrical portion 16 extending into said casing, and having a flange 17. The inner wall of the portion 16 is screw threaded for the reception of a conventional objective. A collar 18 is arranged on the outside of the casing. A cover 20 is attached to the outside of the casing 10 by screws 21 or the like and receives a ring 106 of the setting mechanism slidably arranged on the collar 18. A pointer 22 shown in Fig. 2 forms a part of a usual iris diaphragm mechanism not illustrated in the drawings.

The pins 24 and 26 (see Figs. 1, 3, and 4) are screwed into the bottom 12 of the casing 10 or are secured thereto in any other suitable manner. The blade carrier 28 is swingably mounted on the pin 26 and carries a stud 30 at its free end (see also Fig. 16). The shutter is equipped with the two shutter blades 32 and 34, the first one being below the second one and being slidably arranged on the flange 17 of the circular portion 16. Each of said shutter blades 32 and 34 has a circular hole 36 and 38 respectively as well as an elongated opening 40 and 42 respectively. The pin 24 passes through the hole 36 of the shutter blade 32. The stud 30 of the blade carrier 28 passes through the elongated slot 40 of said shutter blade 32 and through the elongated slot 42 of the shutter blade 34, the circular hole 38 of which is topped onto the pin 26. Fig. 1 shows the shutter blades and the blade carrier 28 in a position in which the shutter blades close the exposure aperture 14. Fig. 4 shows the blade carrier 28 in a different position. If the blade carrier 28 is swung about its pivot 26 from the position according to Fig. 1 into the position shown in Fig. 4, the stud 30 passing through the slots 40 and 42 of the shutter blades 32 and 34 causes a movement of said shutter blades into the position shown in dash and dot lines in Fig. 4 in which the shutter blades open the exposure aperture 14. A spring 44 is wound around a pin 46 secured to the bottom of the casing, one arm of said spring 44 bears against the wall of the casing 10 and the other arm of said spring bears against the blade carrier 28, so that said spring tends to return said blade carrier 28 against a stop 29 secured to the bottom of the casing into the position shown in Fig. 1 in which the shutter blades 32 and 34 close the exposure aperture 14. The blade carrier 28 is provided with the two inclined walls 48 and 50 near its pivot point 26. The wall 48 is arranged on one side of the pivot 26 and the wall 50 is arranged on the other side of said pivot 26. Said walls form abutments for a purpose to be described later on. As best shown in Fig. 16, the height of the wall 48 is less than the height of the wall 50 and the blade carrier 28.

The above described shutter blade mechanism is actuated by the main lever 52. One end 54 of said main lever 52 is swingably mounted on a screw bolt 56 screwed into the bottom 12 of the casing 10. The other end 58 of the main lever is adapted to engage the abutment 48 of the blade carrier 28 to swing same about its pivot 26 as will be described later on. A tensioning spring 60 is wound around the screw bolt 56, one arm 62 of said spring 60 is engaged with a hole 64 provided in said main lever 52, and the other arm 66 of said tensioning spring 60 is in slidable engagement with the free end 68 of a tensioning lever 70 pivotally mounted in the casing 10 at 72. The spring 60 presses the tensioning lever 70 against the wall of the cylindrical portion 16 and tends to swing the main lever 52 about its pivot 56 for actuating the blade carrier 28 by means of its free end 58.

If the parts of the shutter are in the normal closing position shown in Fig. 1, a trigger 80 swingably mounted about a pivot 82 holds the main lever 52 in its tensioned inoperative position by means of a hook 96 engaging the main lever 52 as best shown in Fig. 15. A spring 88 stretched between a lug 92 of the trigger 80 and a member 90 secured to the casing 10 tends to rotate the trigger in counter-clockwise direction, so that said hook 96 holds the main lever 52 in the inoperative position. In order to retain the main lever 52 in a tensioned inoperative position during the beginning of a releasing rotation of the trigger 80 in clockwise direction, I provide a lug 74 on the main lever 52 which abuts against a resilient locking member 76, as soon as the trigger is rotated by means of its handle 84 extending through a slot 86 of the side wall of the casing 10 and projecting therefrom. The locking member 76 is formed of a wire, one end of which being secured to the bottom of the casing 10 by means of a screw 78. As long as the locking member 76 is in the position shown in Fig. 1 and the lug 74 abuts against said locking member 76, the main lever 52 is tensioned and held in its inoperative position.

The lug 74 of the main lever 52 may be released from the locking member 76 by means of a further movement of said trigger 80 about its pivot 82. The trigger 80 has an extension 94 which is substantially parallel to the bottom 12 of the casing and abuts against the resilient locking wire 76, if the trigger 80 is sufficiently rotated about the pivot 82. If, for example, the trigger 80 is brought into the position shown in Fig. 3, the extension 94 presses the resilient locking member 76 away from the lug 74 of the main lever 52, so that the latter is disengaged from the locking member 76 and the spring 60 may rotate the main lever 52 about the pivot 56 for the operation of the blade carrier 28. After the actuation of the blade carrier by the main lever 52, the main lever may be returned into its inoperative position by the actuating element or the hook 96 of the spring actuated trigger 80. As soon as the hook 96 is engaged with the edge 53 of the main lever 52 as shown in Figs. 9 and 14, the spring 88 may return the main lever 52 from its operative position shown in Fig. 12 into its inoperative position shown in Fig. 1. Obviously, the spring 88 moves the main lever 52 against the action of the spring 60 which is, thus, tensioned. The hook 96 has a comparatively long projection 97 (see Fig. 15) which prevents the main lever 52 from an undesired upward tilting. Furthermore, the actuating hook 96 has an inclined cam edge 98 for a purpose to be described later on. Moreover, the trigger has an abutment 100 which may cooperate with the end of a conventional wire release to be screwed into the hub 102.

The member 90 described above in connection with the spring 88 has a stop 104 at its lower side, which may cooperate with the lug 74 to hold the main lever 52 in the position for open shutter blades, if the shutter is set for "time" exposure, as will be described later on in connection with Figs. 6 and 7.

The setting mechanism of the shutter is as follows:

As pointed out above, a ring 106 is movably arranged on the collar 18 outside the casing 10. Said ring 106 has a pointer 108 which may be moved along a scale 110 secured to the wall of the casing 10. Said scale is provided with markings "T," "B," "1/25," "1/50," . . . which indicate the position for "time" exposure, "bulb" exposure and various "instantaneous" exposures. The ring 106 carries a pin 112 which projects through a curved slot 114 arranged in the bottom of the casing. When the ring 106 is rotated about the collar 18 by means of the pointer 108, the pin 112 slides in said curved slot 114 and may be brought into either one of the positions indicated in Fig. 12 by "T," "B," "1/25," "1/50," "1/100," "1/200," "1/300." Said pin 112 cooperates with a controlling edge 113 of an intermediate portion of the main lever 52. Said controlling edge has an irregular shape formed by recesses and projections of various sizes. The pin 112 forms a stop limiting the counter-clockwise movement of the main lever 52, if the latter is released and a point of said controlling edge 113 abuts against said pin 112. Obviously, the deeper the recess the more the main lever 52 may be moved in counter-clockwise direction. Thus, the pin 112 of the setting mechanism controls in cooperation with the controlling edge the end positions of the main lever 52 for various exposures. It might be mentioned that a dampening spring 116 is attached to the lower surface of the main lever 52 at a point of the controlling edge 113 which is opposite to the pin 112, when the latter is set for an exposure of 1/25 of a second. Preferably, the end 118 of said spring 116 is soldered to the surface of the lever 52, while the end 120 of the spring 116 is free and may slide on the lower surface of the main lever 52. Said spring 116 acts as a shock absorber and retards the movement of the main lever 52 to a certain degree shortly before the abutment of the lever against the pin 112 adjusted for an exposure of 1/25 of a second. The pin 112, however, does not only control the extreme position of the main lever 52, but serves also to vary the tension of the spring 60 to obtain various instantaneous exposures of different lengths of time. As will be apparent from Fig. 12, a further rotation of the ring 106 and pin 112 in clockwise direction causes a slidable engagement between the pin 112 and the tensioning lever 70, so that the latter is rotated about its pivot 72, whereby the free end 66 of said lever 70 moves the arm 66 of the spring 60 in a direction towards the wall, so that the tension of the spring 60 is increased, if the pin 112 is moved from the "1/25" position towards the "1/300" position. On the other hand a movement of the pin 112 from the "1/300" position towards the "1/25" position causes a rotation of the lever 70 about the pin 72 in clockwise direction by means of the action of the spring 60, whereby the tension of the latter is decreased. Obviously, the higher the tension of the spring, the higher the speed of the main lever 52, if released.

In the above described Figs. 1–14 the catching member 90 and the locking member 76 are two separate pieces, the first one being soldered to the side wall of the casing 10, the latter being attached to the bottom of the casing by means of a screw 78. Fig. 17 illustrates another embodiment of said two members, according to which the locking member and the catching member are formed by means of a single resilient wire 7690 which is attached to the bottom 12 of the casing 10 by means of a screw 78. If the lug 74 of the main lever 52 abuts against one end of said member 7690, it may be released therefrom by means of the extension 94 of the trigger 80, if the latter is rotated about its pivot 82 as described above.

Fig. 18 illustrates still another embodiment of the combination of a locking and catching member 9076. According to this embodiment said member 9076 is formed of a rigid material and is attached to the bottom 12 of the casing by means of the screw 78. One end of the spring 88 is secured to said member 9076, the other end of said spring 88 is secured to the handle 84 of the trigger 80. As the member 9076 is made of a non-resilient rigid material, the lug 74 cannot be disengaged from said member by pressing said member aside, as is true of the resilient member 76 or 7690 described above. Therefore, I arrange a cam-like projection 940 on the trigger 80. If the trigger 80 is rotated in clockwise direction, the hook 96 is disengaged from the main lever 52 and the cam-like projection 940 is engaged with said main lever 52. The inclined lower surface of said cam-like projection 940 depresses the main lever 52, so that the lug 74 is brought into a level below the locking member 9076, whereby it is disengaged therefrom, so that it may be moved in the direction of the arrow A.

The operation of the device is as follows:

*Bulb exposure*

Although the sequence of the setting positions of the setting mechanism is "time" exposure (T-exposure), "bulb" exposure (B-exposure) and "instantaneous" exposures (I-exposures), I will describe the "bulb" exposure first, as the movements of the individual parts of the shutter are the simplest ones.

The shutter shown in Figs. 1, 3 and 4 is adjusted for B-exposure. In Fig. 1 shows the parts of the shutter in normal position in which the shutter blades close the exposure aperture 14. In order to take a picture with B-exposure, the trigger 80 is depressed by means of the handle 84. As shown in Fig. 1, the spring 88 acting on the trigger 80, the hook 96 of which is engaged with the main lever 52 holds the lug 74 at a small distance from the locking member 76, if the parts are in their normal position. Now, if the trigger 80 is rotated, the spring 60 causes the lug 74 of the main lever 52 to abut against the locking member 76, so that during the beginning of the rotation of the trigger 80 the main lever 52 is retained in its tensioned inoperative position. As soon as the trigger 80 is brought into the position shown in Fig. 3, the extension 94 pushes the resilient locking member 76 aside, so that the lug 74 is disengaged from said locking member 76. Now, the spring 60 rotates the main lever 52 in counter-clockwise direction, until the projection 122 of the controlling edge 113 abuts against the stopping pin 112 as shown in Fig. 4, and the lug 74 is below the stop 104 of the catching member 90 without being engaged therewith as shown in Fig. 5. During said movement of the main lever 52, the end 58 of the main lever 52 contacts the inclined abutting wall 48, rotates the blade carrier 28 about its pivot 26 and slides along a part of said wall until it comes to a stop by means of the pin 112 limiting the movement of the main lever 52. Fig. 4 shows the end position of the portion 58 of the main lever 52 for the B-exposure in which the end 58 is still in contact with the inclined wall 48 and holds the blade carrier 28 in the position for open shutter blades. Now, if the user of the shutter releases the trigger 80 and the latter is rotated in counter-clockwise direction by means of the spring 88, the hook 96 engages the edge 53 of the main lever 52, whereby the latter is rotated in clockwise direction and the spring 60 is automatically tensioned for the next operation by means of said spring 88. The movable parts of the shutter are returned into the position shown in Fig. 1 in which the end 58 of the main lever 52 is disengaged from the abutment 48 of the blade carrier 28 which has been returned into the closing position by means of the spring 44. The spring actuated trigger 80 holds the main lever 52 in its tensioned inoperative position until the next operation takes place.

*Time exposure*

In Figs. 6 and 9 the pin 112 is set for T-exposure. If the lug 74 of the main lever 52 is released from the locking member 76 in the above described manner and the trigger 80 is in the position shown in full lines in Fig. 6, the spring 60 rotates the main lever 52 in counter-clockwise direction until the recess 124 of the controlling edge 113 of the main lever 52 abuts against the pin 112 as shown in Fig. 6 and in full lines in Fig. 8. During said movement of the main lever 52 its end 58 slides on the inclined wall 48 of the blade carrier 28 and moves the blade carrier 28 into open position. If the main lever 52 is in the position shown in Fig. 6, the end 58 is still in contact with the inclined wall 48 and holds the blade carrier 28 in the open position. The lug 74, however, is not below the stop 104 as is true of the B-exposure and as is shown in Figs. 4 and 5, but the lug 74 is somewhat in front of the stop 104, as the recess 124 permits a movement of the main lever 52 to such an extent. Now, as soon as the user of the shutter releases the trigger 80, the inclined cam-like surface 98 (see Figs. 6 and 8) of the actuating member 96 engages the edge 53 of the main lever 52 and lifts same above the pin 112 into the position shown in dot and dash lines in Fig. 8. At the same time the lug 74 is lifted and is engaged with the stop 104 of the catching member 90 as best shown in Figs. 6 and 7. Thus, the spring 88 can return the trigger 80 only into the intermediate position shown in dot and dash lines in Fig. 6 in which the lug 74 is engaged with the stop 104 and the blade carrier 28 is held in open position. Now, if during the next step for T-exposure, the user of the shutter depresses the trigger 80 again and rotates same from the dot and dash line position shown in Fig. 6 into the position shown in Fig. 9, the spring 60 rotates the main lever 52 further in counter-clockwise direction, and the main lever comes from the position shown in Figs. 6 and 8 into the position shown in Figs. 9 and 11. During this movement, the lifted lever 52 is moved above the upper end of the pin 112. Furthermore, the end 58 of the main lever 52 is disengaged from the abutment 48, so that the spring 44 returns the blade carrier 28 into closing position. Said return movement of the blade carrier 28 is possible, as the main lever 52 has a recess 125 near its end 58, and said recess may receive the projecting inclined wall 48 of the blade carrier 28. Fig. 10 illustrates the movements of the lug 74 during this second step of the T-exposure. As pointed out above and illustrated in Fig. 7, the lug 74 is engaged with the stop 104 at the end of the first step of the T-exposure. If, during the second step of the T-exposure, the main lever 52 performs the above described movement from the position shown in Figs. 6 and 8 into the position shown in Figs. 9 and 11, the lug is first brought into the position 74' shown in dash lines in Fig. 10. Then, the inclined cam edge 98 of the actuating member 96 causes a lifting of the lug 74, so that the latter comes into the position shown in full lines in Fig. 10 in which it is in a level above the catching member 90. Now, if the user of the shutter releases the spring actuated trigger 80, the hook 96 thereof which is engaged with the main lever 52 returns the main lever into the inoperative tensioned position shown in Fig. 1. During this return movement of the main lever 52, the lug 74 moves above the catching member 90 and the lifted end 58 of the main lever 52 passes through the space 49 (see Fig. 16) above the wall 48 of the blade carrier 28, so that the main lever 52 is returned into its inoperative position without any obstruction.

*Instantaneous exposure*

If the setting mechanism is set for an exposure of 1/25 of a second, 1/50 of a second or 1/100 of a second, the pin 112 cooperates with the recess 126 of the controlling edge 113 as shown in Figs. 12 and 13. If the lug 74 of the main lever is disengaged from the locking member 76 by a rotation of the trigger 80, the spring 60 rotates the main lever 52 in counter-clockwise direction, until the edge of the recess 126 abuts against the pin 112. During this movement of the main lever 52, the end 58 of the main lever 52 slides along the inclined wall 48 of the blade carrier 28 which is rotated into open position as shown in full lines in Fig. 13. Shortly before the recess 126 abuts against the pin 112, the end 58 of the main lever 52 is disengaged from the inclined wall of the blade carrier 28, so that the latter is returned into closing position by means of the spring 44 as shown in dash lines in Fig. 13. Obviously, the length of time during which the blade carrier 28 is in open position depends on the speed with which the end 58 of the main lever 52 slides along the inclined wall 48. The speed of the main lever 52 in turn depends on the tension of the spring 60 and the tension of said spring 60 is adjusted by means of the pin 112 acting against the lever 70 as described above. If the setting mechanism is adjusted for an exposure of 1/25 of a second as shown in Fig. 12, the dampening spring 116 contacts the pin 112 and acts against the tension of the spring 60, so that the speed of the main lever 52 is somewhat retarded. Thus, the arrangement of the dampening spring 116 permits the use of a strong main spring 68, so that it becomes possible to obtain on one hand very short instantaneous exposures and on the other hand a comparatively long instantaneous exposure. If the main lever 52 is in the position shown in Fig. 13 in which the end 58 is disengaged from the inclined wall 48, the spring 44 automatically closes the shutter blades by returning the blade carrier 28 into the position shown in dash lines as described above. Now, if the user of the shutter releases the trigger 80, the latter returns the main lever 52 into its normal position in the same manner as described for the returning movement of the main lever 52 after the second step of the time exposure, i. e., the lug 74 is moved above the catching member 90 and the end 58 of the main lever 52 passes through the space 49 above the wall 48 of the blade carrier 28.

Fig. 14 illustrates the operation of the movable parts of the shutter, if the latter is set for extremely short instantaneous exposures, for example for an exposure of 1/200 of a second. In such a case the pin 112 is opposite to the recess 128 of the controlling edge 113 of the main lever 52. The recess 128 has such a depth that it does not contact the pin 112, if the main lever 52 is released by the trigger 80. While in the adjustment for slower instantaneous exposures illustrated in Fig. 13 the pin 112 cooperating with the recess 126 holds the main lever 52 in such a position that the lug 74 does not contact the inclined wall 50 of the blade carrier 28, the adjustment of the pin 112 for extremely short instantaneous exposures illustrated in Fig. 14 permits a movement of the main lever 52 to such an extent that the corner 130 of the main lever 52 may abut against the cylindrical portion 16. Therefore, the lug 74 abuts against the inclined wall 50 immediately after the disengagement of the end 58 from the inclined wall 48. The lug 74 slides along the inclined wall 50, whereby it turns the blade carrier 28 into closing position before the spring 44 may act. Thus, the blade carrier 28 is brought into closing position within a shorter time than it would be possible by the action of the spring 44. The return movement of the main lever 52 from the position shown in Fig. 14 into the normal inoperative position takes place in the same manner as described above in connection with Fig. 13, for example.

I have described preferred embodiments of my invention, but it is clear that numerous changes and omissions may be made without departing from the spirit of my invention. For example, while the embodiment of the shutter illustrated in the drawings shows a projection 122 of the controlling edge 113 which abuts against the pin 112 when the shutter is set for B-exposure (Figs. 1, 3 and 4), I could arrange a further recess on the controlling edge for the cooperation with the pin 112 when the shutter is set for B-exposure. In such a case, at the end of a depression of the trigger 80, the main lever 52 would be held in a position, in which it is somewhat nearer to the cylindrical portion 16 but has its end 58 still in contact with the blade carrier 28, and after the release of the trigger, the main lever would be lifted over the pin 112 and first moved forwardly for the disengagement of its end 58 from the blade carrier and then returned into the normal inoperative position in a manner similar to the movements during the second step of the time-exposure.

What I claim is:

1. A photographic shutter comprising: shutter blades, a spring pressed pivoted main lever for operating said shutter blades, an adjustable setting mechanism, said setting mechanism being adapted to cooperate with said spring pressed main lever for the determination of various exposures to be caused by the operation of said main lever, locking means for retaining said main lever in a tensioned inoperative position, a trigger for releasing said main lever from said locking means to initiate the operation of the main lever, resilient means connected to said trigger for returning same from its releasing position into its normal inoperative position, and an actuating element arranged on said trigger, said actuating element being adapted to engage said main lever for returning same into its tensioned inoperative position when said resilient means returns said trigger into its normal inoperative position.

2. A photographic shutter comprising: shutter blades, a main lever for operating said shutter blades, one end of said main lever being pivotally mounted in said shutter, the other end of said main lever being adapted to operate said shutter blades, a spring connected to said main lever for swinging same from its inoperative position into its operative position, adjusting means for varying the tension of said spring, a portion of said main lever having an irregular controlling edge, an adjustable setting mechanism, an adjusting member arranged in said setting mechanism, said adjusting member being adapted to actuate said adjusting means and to form a stop for said controlling edge of the main lever for the determination of various exposures to be caused by the operation of said main lever, locking means for retaining said main lever in a tensioned inoperative position, a trigger for releasing said main lever from said locking means to initiate the operation of the main lever, resilient means connected to said trigger for returning same from its releasing position into its normal inoperative position, and an actuating element arranged on said trigger, said actuating element being adapted to engage said main lever for returning same into its tensioned inoperative position when said resilient means returns said trigger into its normal inoperative position.

3. A photographic shutter comprising: a casing, said casing having an exposure aperture, shutter blades movably mounted in said casing, a main lever for operating said shutter blades, one end of said main lever being pivotally mounted in said casing, the other end of said main lever being adapted to operate said shutter blades, a spring, one end of said spring being connected to said main lever for swinging same from its inoperative position into its operative position, a tensioning lever pivotally mounted in said casing, the free end of said tensioning lever being in engagement with the other end of said spring, the bottom of said casing being provided with a slot, a portion of said main lever having an irregular controlling edge, a collar, said collar surrounding said aperture and being arranged outside said casing, an adjustable setting ring movably arranged on said collar, an adjusting pin secured to said ring, said adjusting pin passing through said slot and being adapted to actuate said tensioning lever and to form a stop for said controlling edge of the main lever for the determination of various exposures to be caused by the operation of said main lever, locking means for retaining said main lever in a tensioned inoperative position, a trigger for releasing said main lever from said locking means to initiate the operation of the main lever, resilient means connected to said trigger for returning same from its releasing position into its normal inoperative position, and an actuating element arranged on said trigger, said actuating element being adapted to engage said main lever for returning same into its tensioned inoperative position when said resilient means returns said trigger into its normal inoperative position.

4. A photographic shutter as claimed in claim 2, in which said controlling edge is provided with recesses of various sizes.

5. A photographic shutter as claimed in claim 2, in which said controlling edge is provided with recesses of various sizes and with at least one projection.

6. A photographic shutter as claimed in claim 2, dampening means being associated with said main lever for dampening the abutting effect of the controlling edge against the stopping adjusting member.

7. A photographic shutter as claimed in claim 2, a spring being arranged at an intermediate point of the controlling edge for dampening the abutting effect of the controlling edge against the stopping adjusting member.

8. A photographic shutter comprising: shutter blades, a spring pressed pivoted main lever for operating said shutter blades, an adjustable setting mechanism, said setting mechanism being adapted to cooperate with said spring pressed main lever for the determination of various exposures to be caused by the operation of said main lever, a lug arranged on said main lever, locking means, said lug being adapted to be brought into engagement with said locking means for retaining said main lever in a tensioned inoperative position, a trigger for disengaging said locking means from said lug to initiate the operation of the main lever, resilient means connected to said trigger for returning same from its releasing position into its normal inoperative position, and an actuating element arranged on said trigger, said actuating element being adapted to engage said main lever for returning same into its tensioned inoperative position when said resilient means returns said trigger into its normal inoperative position.

9. A photographic shutter comprising: shutter blades, a spring pressed pivoted main lever for operating said shutter blades, an adjustable setting mechanism, said setting mechanism being adapted to cooperate with said spring pressed main lever for the determination of "time" exposure, "bulb" exposure or various "instantaneous" exposures to be caused by the operation of said main lever, a lug arranged on said main lever, locking means, said lug being adapted to be brought into engagement with said locking means for retaining said main lever in a tensioned inoperative position, a trigger for disengaging said locking means from said lug to initiate the operation of the main lever, resilient means connected to said trigger for returning same from its releasing position into its normal inoperative position, a catching member, an actuating element arranged on said trigger, said actuating element having a cam edge and being adapted to engage said main lever when said resilient means returns said trigger, said cam edge being adapted to lift said main lever into a level above said catching member for a return of the main lever into its normal inoperative position by said actuating element, and said lug being adapted to be engaged with said catching member preventing a return of the main lever into inoperative position when said resilient means tends to return said trigger and said setting mechanism is adjusted for "time" exposure.

10. A photographic shutter as claimed in claim 9, in which said locking means and said catching member are an integral piece formed of a double armed spring.

11. A photographic shutter as claimed in claim 9, in which said locking means and said catching member are an integral piece made of a rigid material, and the trigger is provided with a cam adapted to engage the main lever for depressing same for the disengagement of the lever from the locking means.

12. A photographic shutter comprising: shutter blades, a swingably mounted blade carrier, said carrier being adapted to actuate said shutter blades, a spring connected to said blade carrier for returning same to its normal position to hold the shutter blades in closing positions, a first abutment arranged on said blade carrier on one side of its pivot, a second cam-like abutment arranged on said blade carrier on the other side of its pivot, a spring pressed pivoted main lever for operating said blade carrier, a portion of said main lever being adapted to contact said first abutment for moving the shutter blades into open position, an adjustable setting mechanism, said setting mechanism being adapted to cooperate with said spring pressed pivoted main lever for the determination of various exposures to be caused by the operation of said main lever, a lug arranged on said main lever, said lug being adapted to contact and slide on said second cam-like abutment for moving the shutter blades into closed position when the setting mechanism is adjusted for very short instantaneous exposures, and means associated with said setting mechanism for limiting the movement of said main lever to prevent a contact between said lug and said second cam-like abutment when the setting mechanism is adjusted for other predetermined exposures.

13. A photographic shutter comprising: shutter blades, a pivot, a blade carrier, said blade carrier being swingably mounted on said pivot and being adapted to actuate said shutter blades, a closing spring connected to said blade carrier for returning same into its normal position to hold the shutter blades in closing position, said blade carrier having a first inclined wall near said pivot on one side thereof, said blade carrier having a second inclined wall near said pivot on the other side thereof, said first and second wall forming a first and second abutment, a spring pressed pivoted main lever for operating said blade carrier, one end of said main lever being adapted to contact and slide on said first abutment for moving the shutter blades into open position, an adjustable setting mechanism, said setting mechanism being adapted to cooperate with said spring pressed main lever for the determination of "time" exposure, "bulb" exposure or various "instantaneous" exposures, to be caused by the operation of said main lever, a lug arranged on said main lever, locking means, said lug being adapted to be brought into engagement with said locking means for retaining said main lever in a tensioned inoperative position, a trigger for disengaging said locking means from said lug to initiate the operation of the main lever, said lug being adapted to contact